Jan. 18, 1949.  P. KELLNER  2,459,324
PAN GREASING MACHINE
Filed July 18, 1946  3 Sheets-Sheet 1
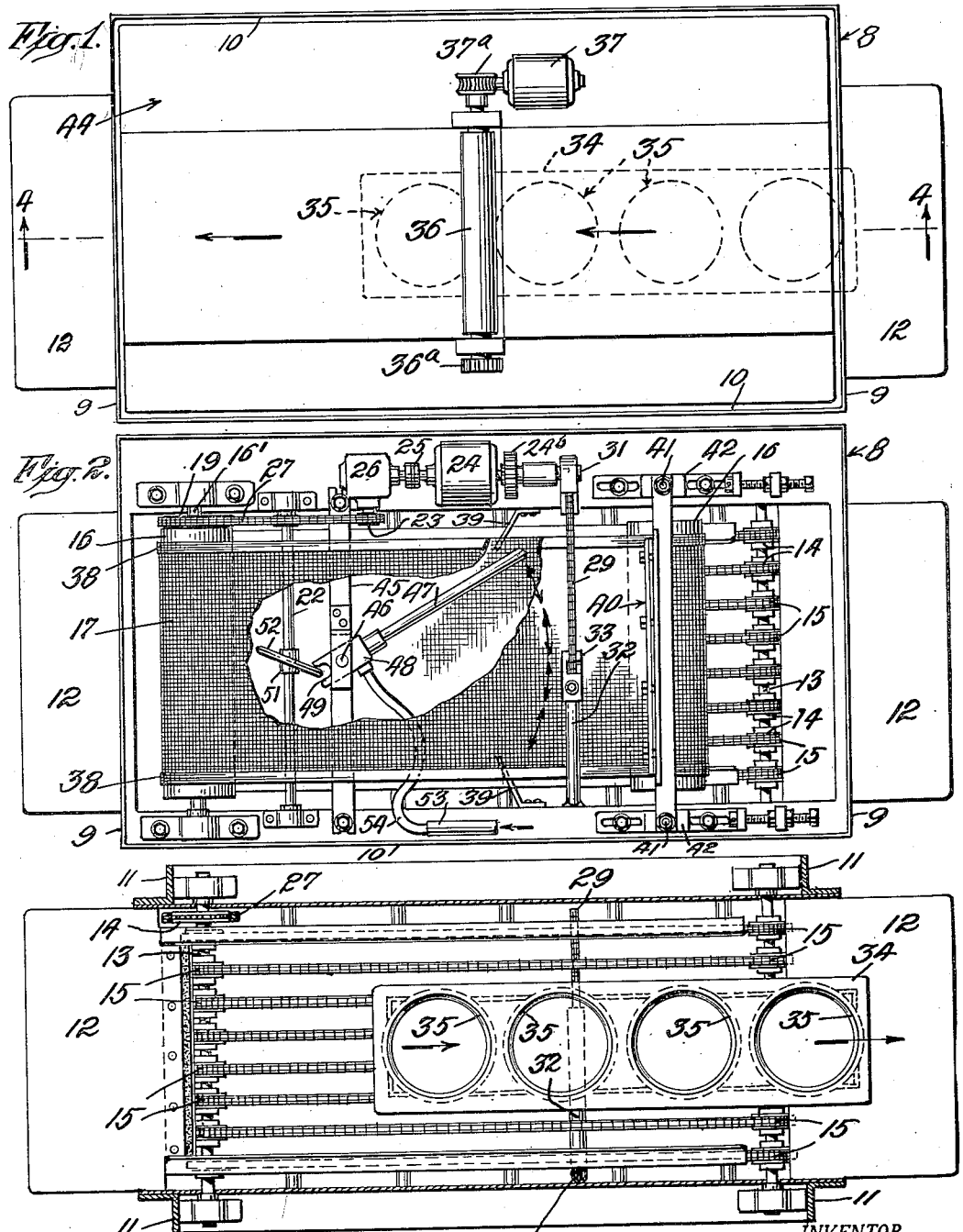
INVENTOR.
PAUL KELLNER
BY Hauff & Barland
ATTORNEYS

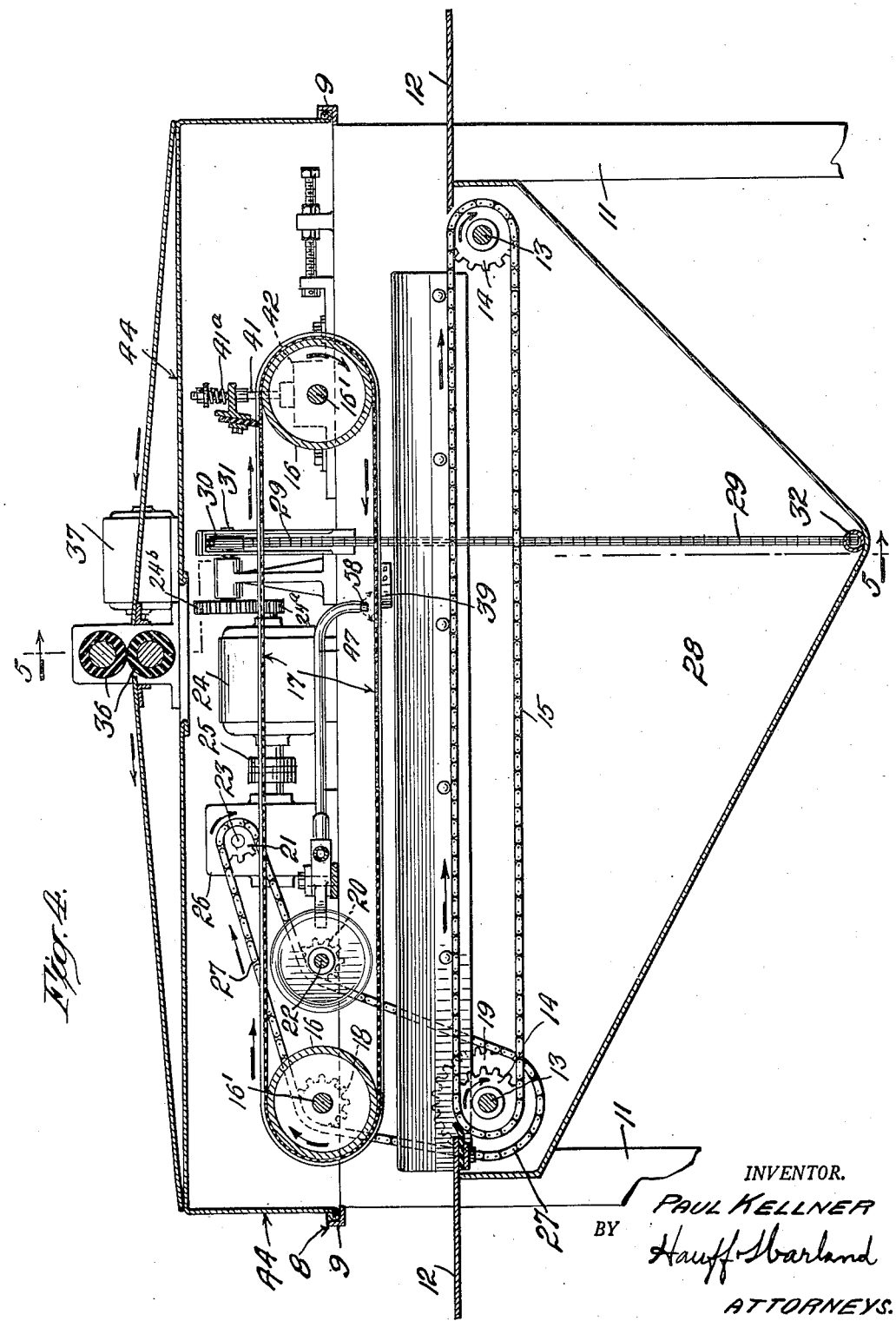

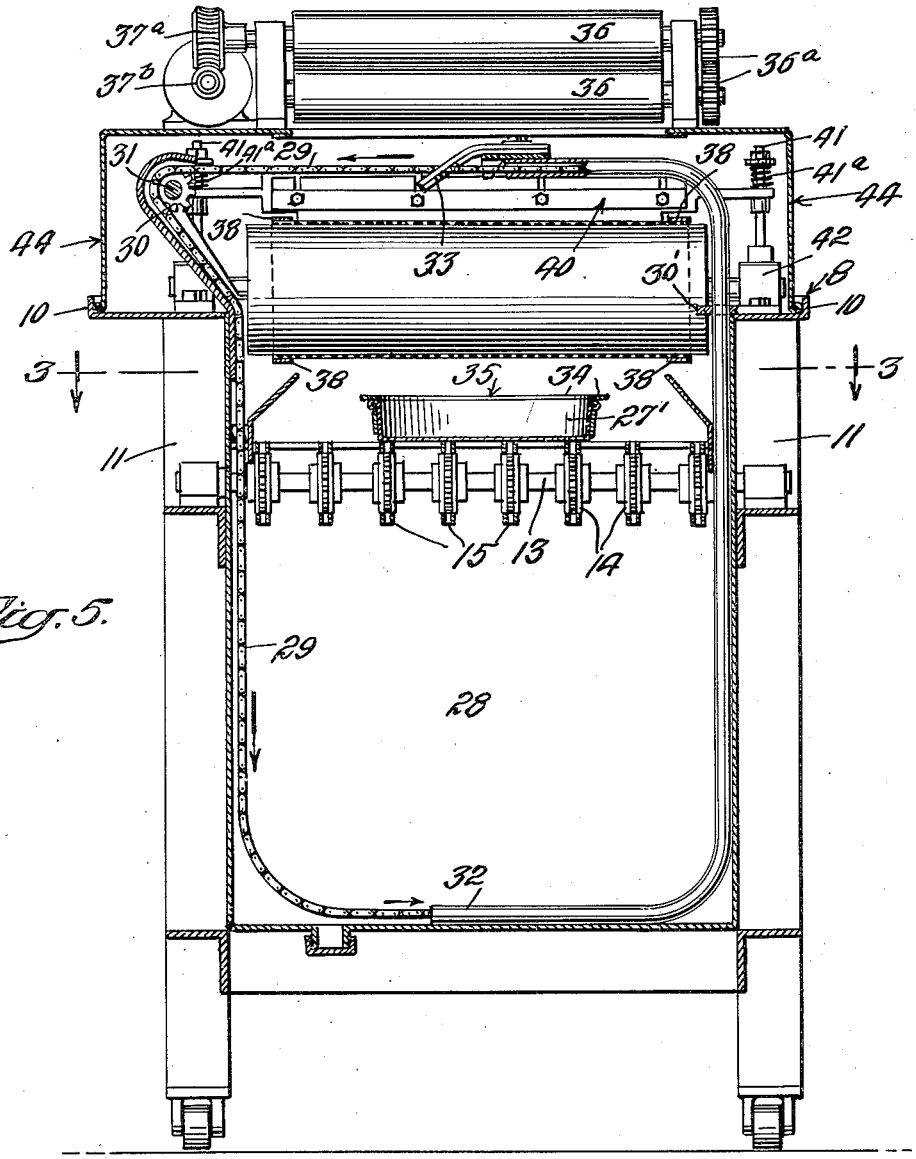
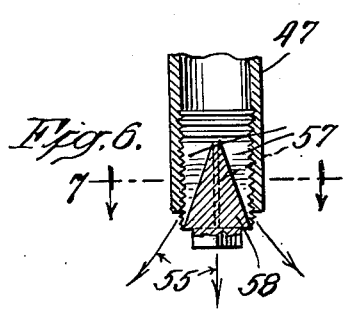

Patented Jan. 18, 1949

2,459,324

UNITED STATES PATENT OFFICE 2,459,324

PAN GREASING MACHINE

Paul Kellner, New York, N. Y., assignor to Dukay Machinery Corporation, New York, N. Y., a corporation of New York Application July 18, 1946, Serial No. 684,399

7 Claims. (Cl. 91—44)

My invention consists of a new and improved machine for coating articles and comprises means for coating the article in a simple, rapid and economical manner.

This application is a continuation in part of my application Serial No. 606,515, filed July 23, 1945, and now abandoned.

While the machine of my invention may be used for coating various kinds of articles with different kinds of coating, it is primarily used for greasing baking pans in baking establishments. It is well known that in order to bake cakes, biscuits, etc., in a pan it is necessary to grease the interior of the pan. The greasing must be done so as to cover the entire area of the pan. If a spot is left ungreased, the material to be baked will burn. If there is too much grease the baked material will be soggy. If a pan of biscuits, for instance, is put in an oven and there is an excess amount of grease around the top of the pan, the excess grease not only burns and gives off a disagreeable odor but also forms a hard coating or filament which stains the pan and is very difficult, and in many cases impossible, to remove.

An object of the present invention is to thoroughly grease the interior portion of a baking pan of any desired shape.

A further object of the invention is to protect that portion of the pan or receptacle which does not contain the material to be baked, from grease.

A further object of the invention is to have a machine which is simple in construction and operates rapidly thereby saving a great amount of time and labor.

The device consists essentially of an upright rectangular open frame, having sides and ends resting on uprights. At the top of the frame and substantially level with the top is a series of chains driven by shafts on which are mounted sprockets, at each end of the frame. These chains carry the pans or receptacles to be greased or coated from one end of the machine to the other. Above the receptacle carrying means is mounted on shafts situated at each end of the machine, an endless belt of foraminous or porous material, preferably nylon. The greasing or coating substance is contained in a receptacle in the bottom or lower part of the frame. In the case of greasing a number of pans for baker's use, the grease is carried from the receptacle by means of a chain running on sprockets and through a tube which delivers the grease on the top of the porous belt where it passes through the belt and is spread by air pressure entirely over the interior of the receptacle to be coated. Above the coated receptacle or receptacles is a removable mask which has openings to correspond with the size of the receptacle to be coated and travels with the receptacles along the chains until it reaches the end of the machine where the receptacles and masks are removed by an operator. The mask is then cleaned or dried by passing through a pair of squeegee rollers on the top of the frame and is then ready for use on another set of pans.

Although the novel features which are believed to be characteristic of this invention will be more particularly pointed out in the claims appended hereto, the invention itself may be better understood by referring to the following description in which a specific example thereof has been set forth for purposes of illustration.

In the accompanying drawings:

Fig. 1 is a plan view of the device;
Fig. 2 is a plan with the cover taken off;
Fig. 3 is a section taken on line 3—3 of Fig. 5;
Fig. 4 is a section on line 4—4 of Fig. 1;
Fig. 5 is a section on line 5—5 of Fig. 4;
Fig. 6 is a detailed section of the airspray nozzle;
Fig. 7 is a section on line 7—7 of Fig. 6.

In the drawings the numeral 8 indicates a rectangular open frame having ends 9 and sides 10 and carried by a frame structure 11. At each end of the frame may be placed boards 12 on which are placed the pans or receptacles to be coated. In an opening in the machine between the ends and sides and nearly at each end thereof are shafts 13 on which are mounted a series of sprockets 14. A series of endless chains 15 run over the sprockets 14. The receptacles 27', the interiors of which are to be coated, are placed on the chains 15 and carried from one end of the structure to the other where they are taken off the board or extension 12 by an operator. Mounted on the frame and above the carrying chains are rollers 16 over which runs an endless belt 17 made of porous or foraminous material, preferably nylon, of practically the width of the machine and covering the chains 15. The chains 15 and belt 17 are actuated by a chain running over sprockets 18, 19, 20 and 21, mounted on shafts 13, 16', 22 and 23. On the top and on one of the sides 10 is mounted a driving motor 24 having a coupling 25 which extends into a casing 26 having a reducing gear from which reducing gear extends a shaft 23 on which is mounted the sprocket 21 to drive the chain 27 over the sprocket 18 which drives the roller 16, the sprocket 19 on the shaft 13 and sprocket 20 on the shaft 22 to actuate the chains 15 and foraminous belt 17.

The receptacles 27', the interior of which are to be greased or coated, are placed in any desired quantity by the operator on one of the platforms 12, and pushed on to the chains 15 where they are carried by the motion of the chain to another operator stationed at the exit ends of the machine. The greasing of the interior of the receptacles 27' is accomplished in the following manner. A large vat 28 of grease or desired coating material is placed beneath the endless chains 15. An endless chain 29 runs over a sprocket 30 mounted on a shaft 31 driven from a motor 24 by gears 24a and 24b on one side of the machine. This shaft in conjunction with the sprocket carries a chain down through the grease vat 28 where it enters a tube 32 which extends from approximately the center of the vat to the side of the vat, where it is supported in bearings 30' and then bent at substantially right angles so as to be in line with the shaft 31. This endless chain 29 running through the grease carries the grease up through the tube 32 where it comes out of the tube 32 and is taken off by a wiper 33 on to the foraminous belt 17 and is then spread by a scraper 40 on to the belt 17 then is carried around the roller 16 into the path of an air nozzle 47, at which point the grease is blown into the pan 27' carried on the chains 15.

In order to prevent the grease as it is blown through the belt from coming in contact with that portion of the receptacle which is to be kept clear of grease, a plate or mask 34 having holes 35 cut therein of approximately the same diameter as the interior of the receptacle to be greased is placed over the receptacles and as the receptacles are greased and come out on the extension 12 at the exit end of the machine, the mask is removed. The mask 34 is preferably made of thin sheet metal but it may be made of any desired material other than metal which can be readily cleaned. Movably mounted on the top of the rectangular frame 10 and at approximately the center of the machine is a pair of squeegee rollers 36 having a worm 37a driven by a worm 37b from the motor 37 which rotates the roller 36. At the other end of roller 36 are a pair of gears 36a. After the mask has passed through the greasing operation the mask is then passed between the rollers 36 and the grease or coating material which has dropped thereon during the greasing operation is wiped off so that the mask 34 will be perfectly free of grease and clean for the next passage of receptacles through the greasing zone.

In order to confine the grease as much as possible, the foraminous belt 17 has a narrow selvage 38 on each side thereof which not only strengthens the material but keep the grease from spreading over the sides thereof. There are also secured on each side of the frame scrapers 39 which take off a considerable amount of grease as the belt 17 revolves.

At one end of the machine near the roller 16 is mounted a scraper 40 extending the width of the belt 17. The scraper 40 is mounted on upright rods 41 mounted on bearings 42. Springs 41a are interposed between the scraper 40 and adjusting bolt and washer 41b to apply tension to the scraper 40. On the top of the machine may be placed a removable casing 44 in order to keep dust and dirt from entering the machine while in operation.

In order to thoroughly and evenly coat the inside of the receptacles the grease or coating material is blown by an air jet uniformly over the interior of the receptacle to be coated in the following manner.

Mounted on and extending across the top of the machine is a bar 45, on which is pivotally mounted at 46 a nozzle 47. The nozzle 47 is mounted in a head 48 having a bifurcated end 49. Also mounted at the top of and extending across the machine is a revolving shaft 22 having bearings 51. On said shaft 22 is rigidly mounted a cam 52 which turns in the bifurcated ends 49 and swings the nozzle 47 back and forth across the belt 17. The air from any well known source of air pressure enters a metal tube 53 mounted on one side of the machine and to the metal tube is attached the usual rubber tube or hose 54 which coacts with the nozzle 47 and forces the air through the nozzle 47 on to the lower side of the belt 17.

As previously pointed out the nozzle 47 in conjunction with the cam 52 causes the nozzle to swing from side to side and across the entire width of the foraminous belt so that as the receptacles pass under the foraminous belt a constant stream of air through the nozzle 47 sprays the grease entirely over the interior of the receptacle.

To the end of the nozzle 47 is attached a device for adjusting the quantity of air to be sprayed. A sectional view of this device is shown in Fig. 6 and Fig. 7 is a detailed view of the interior of the air adjusting device. It will be seen that as a stream of air 55 passes through the tube or hose 54 and the nozzle 47 it blows a spray of grease over the interior of the receptacle to be coated. At the end of the nozzle 47 is a conical shaped plug 58 which may be threaded in or out. If it is threaded in to the nozzle 47 the amount of air passing through the apertures 57 is decreased.

Certain specific terms have been used herein for convenience in referring to the various details of the invention. It is to be understood, however, that these terms are to be given as broad an interpretation as the state of the art will permit, although a specific embodiment of the invention has been set forth for purposes of illustration, various changes and modifications may be made therein as will be apparent to a person skilled in the art, the invention is only to be limited in accordance with the scope of the following claims.

I claim:

1. A device for greasing receptacles comprising a movably mounted belt of foraminous material, means for imparting longitudinal movement to the belt, a source of grease supply, means for distributing liquid grease on the foraminous belt so as to be carried thereby, means for supporting the receptacles to be coated on one side of the foraminous belt and means for imparting an air blast to the other side of the foraminous belt to spray liquid carried by the belt onto the receptacles.

2. A device for greasing the interior of receptacles comprising a movably mounted belt of foraminous material, means for imparting longitudinal movement to the belt, a source of grease supply, means for supporting the receptacles below one side of the foraminous belt, means for conveying grease from the source to the belt, a wiper for distributing grease deposited on the belt by said last means, a nozzle disposed on the other side of the foraminous belt and means for forcing air through said nozzle onto the foraminous belt to spray liquid carried thereby from the belt to the receptacles.

3. A device for greasing receptacles comprising a movably mounted belt of foraminous material, a source of grease supply, means on one side of the belt for supporting the receptacles with the interior to be coated disposed toward the foraminous belt, means for distributing liquid grease on the belt so as to be carried thereby, a support disposed on the other side of the foraminous belt, a nozzle pivotally mounted on said support, means for supplying air through the nozzle onto the foraminous belt, means for imparting longitudinal movement to the foraminous belt and means for reciprocating the nozzle across the foraminous belt to spray liquid from the belt to the interior of the receptacles.

4. A device for greasing receptacles comprising in combination a movably mounted endless belt of foraminous material, means for imparting longitudinal movement to said belt, a conveyor for receptacles to be greased disposed below the lower run of said belt of foraminous material and capable of movement longitudinally thereof, a source of grease supply, means for conveying liquid grease from the source to the endless belt of foraminous material, and means for distributing the grease evenly on the surface thereof, a nozzle disposed above the lower run of the foraminous belt on the side opposite to the receptacles and means for forcing air through said nozzle onto the foraminous belt to spray liquid carried thereby from the belt to the receptacles.

5. A device for greasing receptacles comprising in combination a movably mounted endless belt of foraminous material, means for imparting longitudinal movement to said belt, a conveyor for receptacles to be greased disposed below the lower run of said belt of foraminous material and capable of movement longitudinally thereof, a source of grease supply, means for conveying liquid grease from the source to the endless belt of foraminous material, and means for distributing the grease evenly on the surface thereof, a support extending between the upper and lower runs of the endless belt of foraminous material, a nozzle pivotally mounted on said support for reciprocation back and forth across the belt of foraminous material, means for reciprocating said nozzle and means for imparting air under pressure to the nozzle to spray grease from the belt of foraminous material to the receptacles.

6. A coating device comprising a belt of foraminous material, means for depositing a liquid coating material on the foraminous belt so as to be carried thereby, a nozzle device directed downwardly onto the foraminous belt, means for supporting articles to be coated on the opposite side of the foraminus belt from the nozzle and means for supplying air under pressure to the nozzle to cause a spray of liquid coating material to be projected from the belt to the articles to be coated.

7. A device for greasing receptacles comprising a pair of spaced rollers, an endless belt of foraminous material mounted on said rollers, means for imparting longitudinal movement to said belt, a source of liquid grease supply, an endless chain submerged at one portion in the liquid grease and extending above the foraminous belt at another portion, means for imparting movement to the endless chain, a wiper for disengaging liquid from the endless chain so as to be deposited onto the foraminous belt, means for conveying a series of receptacles below the lower run of the foraminous belt and in a direction longitudinally thereof, a nozzle directed toward the lower run of the foraminous belt on the side opposite to the receptacles and means for supplying air under pressure to said nozzle to spray grease from the belt to the receptacles.

PAUL KELLNER.

REFERENCES CITED

The following references are of record in the file of this patent:

UNITED STATES PATENTS

| Number | Name | Date |
| --- | --- | --- |
| 1,643,143 | Wilcox | Sept. 20, 1927 |
| 1,643,144 | Wilcox | Sept. 20, 1927 |
| 1,831,535 | Juers | Nov. 10, 1931 |
| 1,885,453 | Larson | Nov. 1, 1932 |
| 2,217,247 | Burns | Oct. 8, 1940 |
| 2,217,724 | Birmingham | Oct. 15, 1940 |
| 2,258,092 | Fogg | Oct. 7, 1941 |
| 2,356,489 | Amstutz | Aug. 22, 1944 |
| 2,376,342 | Carlton | May 22, 1945 |

FOREIGN PATENTS

| Number | Country | Date |
| --- | --- | --- |
| 18,349 | Great Britain | Sept. 1, 1908 |
| 576,753 | Germany | May 16, 1933 |